United States Patent
Deitmerg et al.

(10) Patent No.: US 10,175,066 B2
(45) Date of Patent: Jan. 8, 2019

(54) SENSOR SYSTEM FOR DETECTING ABSOLUTE ROTATIONAL ANGLE OF A SHAFT

(75) Inventors: Martin Deitmerg, Luedenscheid (DE); Marco Rutkowski, Altena (DE); Stefan Garneyer, Hagen (DE); Christian Schirp, Bochum (DE); Oliver Maier, Attendorn (DE); Klaus Hirschfeld, Luedenscheid (DE); Bernd vom Hedt, Hagen (DE); Sven Kober, Bonn (DE); Holger Hasselmann, Essen (DE); Stefan Schroeder, Luedenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 372 days.

(21) Appl. No.: 13/338,598

(22) Filed: Dec. 28, 2011

(65) Prior Publication Data

US 2012/0119731 A1    May 17, 2012

Related U.S. Application Data

(63) Continuation of application No. PCT/EP2010/059139, filed on Jun. 28, 2010.

(30) Foreign Application Priority Data

Jun. 29, 2009 (DE) .......... 10 2009 031 176

(51) Int. Cl.
*G01B 7/30* (2006.01)
*G01D 5/245* (2006.01)
*B62D 15/02* (2006.01)

(52) U.S. Cl.
CPC .......... *G01D 5/245* (2013.01); *B62D 15/0215* (2013.01); *B62D 15/0245* (2013.01); *G01B 7/30* (2013.01)

(58) Field of Classification Search
CPC .. G01D 5/2275; G01D 5/2283; G01D 5/2208; G01D 5/2216; G01D 5/2225;
(Continued)

(56) References Cited

U.S. PATENT DOCUMENTS 5,930,905 A     8/1999  Zabler et al.
6,784,659 B2 *  8/2004  Haji-Sheikh et al. ........ 324/174
(Continued)

FOREIGN PATENT DOCUMENTS

DE           10110785 A1    9/2002
DE         102004004025 A1  10/2004
(Continued)

*Primary Examiner* — David M Schindler
(74) *Attorney, Agent, or Firm* — Brooks Kushman P.C.

(57) ABSTRACT

A system for detecting the absolute rotational angle of a shaft rotatable more than one revolution includes a drive wheel connected to the shaft to rotate therewith. The drive wheel includes measurement sectors adjacent to one another in a circumferential direction. First and second driven wheels are engaged to the drive wheel. First and second sensors monitor rotational positions of the driven wheels to thereby detect an absolute rotational angle of the shaft. A third sensor monitors a relative angular position of the shaft in relation to a detected one of the measurement sectors to thereby detect the relative angular position of the shaft within one revolution of the shaft. The detected absolute rotational angle of the shaft is refined with the detected relative angular position of the shaft to thereby generate the absolute rotational angle of the shaft with more precision.

15 Claims, 3 Drawing Sheets

(58) Field of Classification Search
CPC .... G01D 5/2233; G01D 5/2241; G01D 5/225;
G01D 5/2258; G01D 5/2266; G01D
5/2026; G01D 5/2033; G01D 5/204;
G01D 5/2046; G01D 5/2053; G01D
5/206; G01D 5/22; G01D 5/14; G01D
5/142; G01D 5/145; G01D 5/147; G01D
5/16; G01D 5/20; G01D 5/2006; G01D
5/2013; G01D 5/202; G01D 5/245; G01B
7/02; G01B 7/023; G01B 7/04; G01B
7/046; G01B 7/14; G01B 7/305; G01B
7/31; G01B 7/30; G01B 7/312; G01R
15/20; G01R 15/202; G01R 15/205;
B62D 15/0215; B62D 15/0245
USPC .................................................. 324/207.25
See application file for complete search history.

(56) References Cited

U.S. PATENT DOCUMENTS

| | | | |
|---|---|---|---|
| 7,637,020 | B2 | 12/2009 | Maier et al. |
| 2004/0004471 | A1* | 1/2004 | Haas et al. ................. 324/207.2 |
| 2004/0246148 | A1* | 12/2004 | Kabashima et al. ............ 341/15 |
| 2006/0152214 | A1* | 7/2006 | Hatano .................... 324/207.25 |
| 2007/0090830 | A1* | 4/2007 | Shiraga et al. .......... 324/207.25 |
| 2007/0102226 | A1* | 5/2007 | Matsuda ....................... 180/400 |
| 2007/0252590 | A1* | 11/2007 | Kondo .................... 324/207.25 |
| 2010/0301845 | A1 | 12/2010 | Acker |

FOREIGN PATENT DOCUMENTS

| | | |
|---|---|---|
| DE | 102007010737 A1 | 8/2008 |
| DE | 102008059775 A1 | 6/2009 |

\* cited by examiner

SENSOR SYSTEM FOR DETECTING ABSOLUTE ROTATIONAL ANGLE OF A SHAFT

CROSS-REFERENCE TO RELATED APPLICATIONS

This application is a continuation of International Application No. PCT/EP2010/059139, published in German, with an international filing date of Jun. 28, 2010, which claims priority to DE 10 2009 031 176.9, filed Jun. 29, 2009, the disclosures of which are incorporated by reference.

TECHNICAL FIELD

The present invention relates to an angle sensor for evaluating the absolute rotational angle of a shaft over multiple revolutions in which the angle sensor includes an external sensor system having sensor wheels with sensors for determining the number of revolutions of the shaft and an internal sensor system having an additional sensor wheel that has a coding arranged in its circumferential direction from which an additional sensor detects a relative angular position within one revolution of the shaft whereby the absolute rotational angle of the shaft can be determined from the measured values of the internal and external sensor systems.

BACKGROUND

Certain applications require high resolution angular sensor systems. For example, a high resolution angular sensor system with respect to time sampling and angular resolution is used to implement a high-quality, directly-driven steering actuator in a steer-by-wire system of a vehicle. The steering actuator is at the upper end of the steering column in the vicinity of the driver. Such an angular sensor system is required in order that the actuator controller be able to measure the finest angular changes and thus the smallest changes in torque. Stringent control quality requirements exclude an angular sensor system having hysteresis in the range of the angular resolution. Thus, using an angular sensor system based on purely gear driven measurement technology is problematic.

For a steer-by-wire system in which no permanent connection exists between the steering wheel/steering actuator and the steering kinematic mechanism, and thus no over rotation protection is present for the conventional connection of the electrical components in the steering wheel with the spiral cassette used in the vehicle, it is necessary to cover an absolute measurement region that includes a plurality of revolutions of the actuator.

DE 101 10 785 C2 describes a steering angle sensor. The angle sensor includes a counter wheel that is driven by a shaft having a magnetic encoding system. Magnetic field sensors detect this encoding. The number of revolutions of the counter wheel, and thereby the shaft, can be determined from the sine and cosine shaped output signals of the sensors. Additionally, the shaft directly drives an encoding disk. A scanner detects the encoding of the encoding disk from which the angular position of the encoding disk can be determined within a single revolution. The absolute rotational angle of the angle sensor can be obtained from the collective evaluation of the sensor information from the counter wheel and the encoding disk. The precision that can be achieved for angle detection thus significantly depends on the encoding system applied on the encoding disk.

SUMMARY

An object of the present invention includes an angle sensor that implements a relatively high angular resolution, free from hysteresis, over a measurement region of a plurality of revolutions in a simple and cost effective manner.

In carrying out at least one of the above and other objects, a system for detecting the absolute rotational angle of a shaft that can rotate through a plurality of revolutions. The system includes a drive wheel, first and second driven wheels, first and second sensors, and a third sensor. The drive wheel is connected to the shaft to rotate as the shaft rotates. The drive wheel includes measurement sectors lying adjacent to one another in a circumferential direction of the drive wheel. The driven wheels are engaged to the drive wheel to rotate as the shaft rotates. The first and second sensors respectively monitor rotational positions of the driven wheels to thereby detect an absolute rotational angle of the shaft with a relatively low precision. The third sensor monitors a relative angular position of the shaft in relation to a detected one of the measurement sectors to thereby detect the relative angular position of the shaft within one revolution of the shaft. The detected absolute rotational angle of the shaft is refined with the detected relative angular position of the shaft to thereby generate the absolute rotational angle of the shaft with more precision.

Further, in carrying out at least one of the above and other objects, a method for detecting the absolute rotational angle of a shaft that can rotate through a plurality of revolutions. The method includes connecting a drive wheel to the shaft to rotate as the shaft rotates. The drive wheel includes measurement sectors lying adjacent to one another in a circumferential direction of the drive wheel. The method further includes engaging first and second driven wheels to the drive wheel to rotate as the shaft rotates. The method further includes respectively monitoring rotational positions of the driven wheels to thereby detect an absolute rotational angle of the shaft with a relatively low precision. The method further includes monitoring a relative angular position of the shaft in relation to one of the measurement sectors to thereby detect the relative angular position of the shaft within one revolution of the shaft. The method further includes refining the detected absolute rotational angle of the shaft with the detected relative angular position of the shaft to thereby generate the absolute rotational angle of the shaft with more precision.

Embodiments of the present invention are directed to a rotational angle sensor configured to detect the absolute rotational angular position of a rotatable shaft (e.g., a steering wheel shaft) that can rotate through several rotations (i.e., rotatable by more than 360°). The angle sensor includes an internal sensor system and an external sensor system. The internal sensor system includes a drive wheel. The drive wheel is connected to the shaft to rotate therewith. The drive wheel includes a gear ring. The external sensor system includes first and second driven wheels. Each driven wheel includes a gear ring. The gear rings of the driven wheels engage with the gear ring of the drive wheel such that the driven wheels rotate as the drive wheel rotates as the shaft rotates. Each driven wheel includes a magnet whose magnetic field orientation is a measure of the rotational angle position of the driven wheel. First and second fixedly-placed magnetic sensors respectively monitor the magnetization of the magnets to determine the rotational angle position of the driven wheels. As a result, the external sensor system (which includes the first and second driven wheels and the first and second sensors) can determine the number of rotations of the shaft.

The drive wheel includes a coding arranged in its circumferential direction. The coding includes measurement sectors arranged next to each other in the circumferential direction. A third fixedly-placed sensor is associated with the drive wheel. The measurement sectors may be magnetic-based and the third sensor is correspondingly a magnetic sensor. The third sensor monitors the coding of the drive wheel to determine the relative angle position of the shaft in relation to a measurement sector. As a result, the internal sensor system (which includes the drive wheel with the coding and the third sensor) can detect a relative angle position within one rotation of the shaft. The external sensor system can determine the measurement sector detected by the third sensor. Thus, the absolute rotational angle of the shaft can be determined from the measurement values of the internal and external sensor systems.

In a rotational angle sensor in accordance with embodiments of the present invention, the drive wheel has measurement sectors lying adjacent to one another in the circumferential direction. The sensor of the internal sensor system (i.e., the third sensor) detects the relative angular position of the shaft with respect to a measurement sector. The external sensor system can determine the respective instantaneous measurement sector detected by the internal sensor.

The external sensor system is an absolute measuring system with a relatively small angular resolution over an angular region consisting of a plurality of revolutions. The internal sensor system refines the measured value of the external sensor system. The internal sensor system measures within a small angular range with particularly high resolution. This results in a high hysteresis free angular resolution over a large angular region.

The above features, and other features and advantages of the present invention are readily apparent from the following detailed description thereof when taken in connection with the accompanying drawings. It is understood that the features stated above and to be explained below may be used not only in the particular stated combination, but also in other combinations or alone without departing from the scope of the present invention.

Exemplary embodiments of the present invention are illustrated in the drawings and explained in greater detail in the following description. Identical, similar, or functionally equivalent components are denoted by the same reference numerals.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
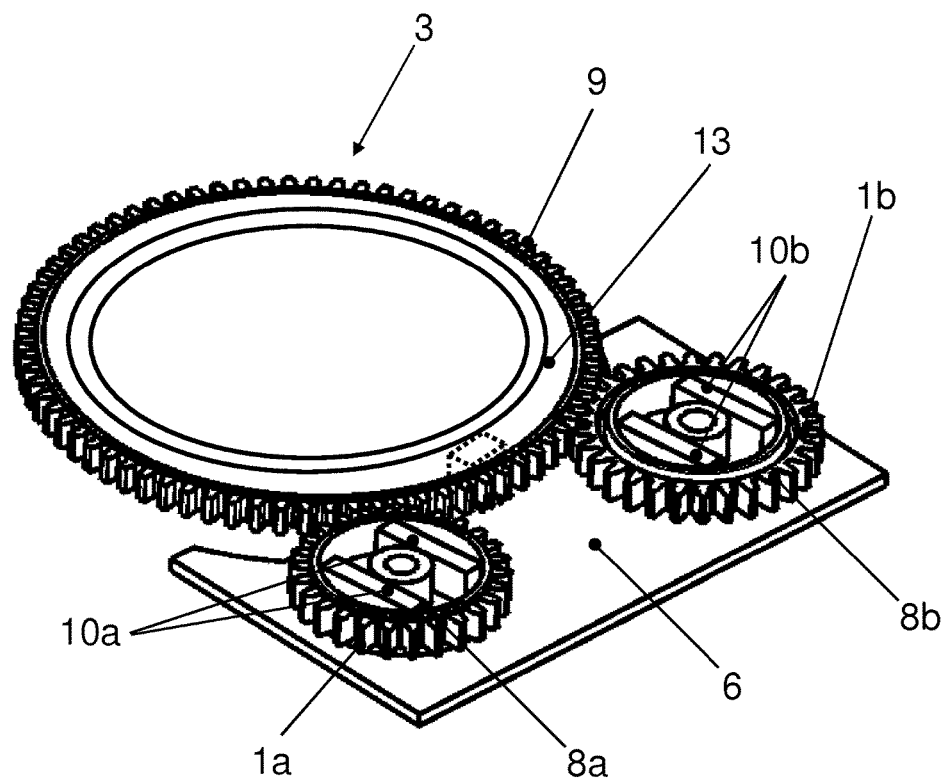
FIG. 1 illustrates a schematic top side view of a rotational angle sensor in accordance with an embodiment of the present invention.
Figure 2:
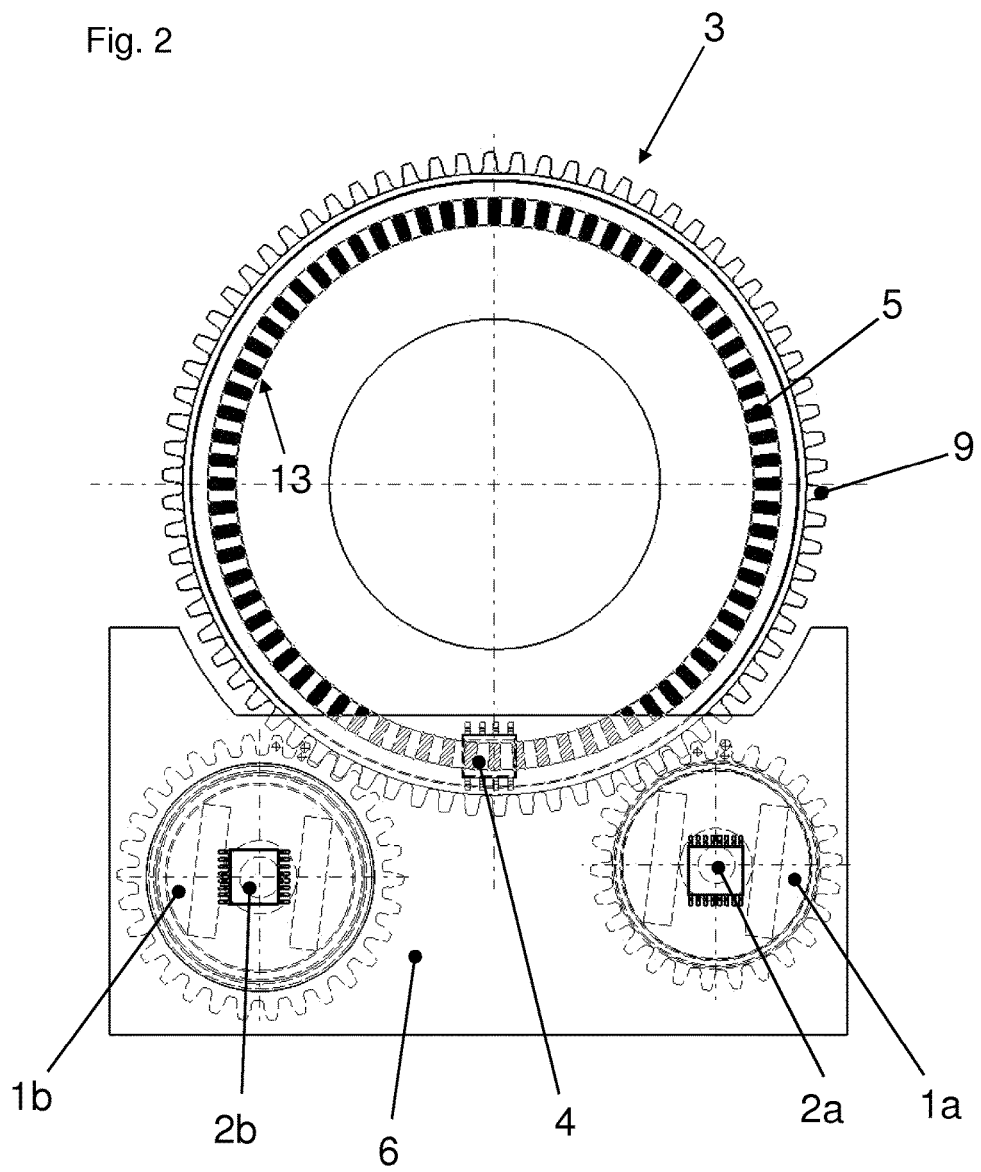
FIG. 2 illustrates a schematic bottom side view of the angle sensor.

Referring now to FIGS. 1 and 2, a rotational angle sensor in accordance with an embodiment of the present invention will be described. The angle sensor is configured to determine the absolute angular position of a rotatable body which can rotate through several revolutions (e.g., 1800°). For instance, the rotatable body is the steering wheel shaft of a vehicle. The angle sensor can determine the absolute angular position of the shaft over an angular measuring range corresponding to the range of available rotation of the shaft. In this example, the angle sensor is a magnetic angle sensor.

The angle sensor includes an external sensor system and an internal sensor system. The external sensor system includes first and second driven wheels 1a, 1b with respective first and second sensors 2a, 2b. The internal sensor system includes a drive wheel 3 with a third sensor 4. Driven wheels 1a, 1b and drive wheel 3 are rotatably-arranged wheels which are formed as cog wheels. Driven wheels 1a, 1b each include a gear ring 8a, 8b. Drive wheel 3 is connected to a shaft (e.g., steering wheel shaft 7 shown in FIG. 3) to rotate therewith. Drive wheel 3 includes a gear ring 9. Gear rings 8a, 8b of driven wheels 1a, 1b engage with gear ring 9 of drive wheel 3 such that driven wheels 1a, 1b rotate with the shaft as drive wheel 3 rotates with the shaft. Thus, the three wheels 1a, 1b, 3 revolve together during a rotation of the shaft.

Driven wheels 1a, 1b respectively include a magnet 10a, 10b inside their respective gear rings 8a, 8b. The magnetic field orientation of magnets 10a, 10b is a measure of the rotational angle position of driven wheels 1a, 1b. First and second sensors 2a, 2b are fixedly-placed magnetic sensors. For instance, first and second sensors 2a, 2b are fixedly-placed on a circuit board 6. First sensor 2a monitors the magnetization of first magnet 10a to determine the rotational angle position of first driven wheel 1a. Likewise, second sensor 2b monitors the magnetization of second magnet 10b to determine the rotational angle position of second driven wheel 1b.

As indicated, driven wheels 1a, 1b engage drive wheel 3 (via respective toothed gear rings 8, 8b of driven wheels 1a, 1b and toothed gear ring 9 of drive wheel 3) such that driven wheels 1a, 1b (and first and second magnets 10a, 10b therein) rotate with the shaft to rotate relative to respective sensors 2a, 2b. Sensors 2a, 2b respectively monitor the magnetization of magnets 10a, 10b to determine the rotational angle positions of magnets 10a, 10 (and thereby first and second driven wheels 1a, 1b). Driven wheels 1a, 1b are driven at different gear ratios such that the rotational angle positions of driven wheels 1a, 1 differ as the shaft rotates. In particular, gear rings 8a, 8b of driven wheels 1a, 1b have different numbers of teeth such that driven wheels 1a, 1b are rotated by gear ring 9 of drive wheel 3 through different angles when the shaft is rotated.

The absolute angle of rotation of the shaft can be determined over a plurality of revolutions in a known manner by a common evaluation of the angular quantities according to the nonius principle, such as described in U.S. Pat. No. 5,930,905. As such, the external sensor system (which includes first and second driven wheels 1a, 1b and first and second sensors 2a, 2b) can determine the number of rotations of the shaft. However, the attainable resolution capability of the angle sensor with only the external sensor system is limited due to the play that arises between gear rings 8a, 8b, 9 and the shape tolerances of the gearing and wheel bearings.

In order to create a relatively high resolution and hysteresis-free angle measuring sensor, the internal sensor system includes the following attributes. Drive wheel 3 includes a coding 13 arranged in its circumferential direction. Coding 13 includes a number of adjacent measurement sectors 5 lying next to one another in the circumferential direction. In this example, coding 13 is a magnet ring having magnetic-based measurement sectors 5. As noted, drive wheel 3 is associated with third sensor 4. Third sensor 4 is a fixedly-placed magnetic sensor. Third sensor 4 monitors magnet ring 13 of drive wheel 3 to determine the relative angle position of the shaft relative to a measurement sector 5. As a result, the internal sensor system (which includes drive wheel 3 with measurement sectors 5 and third sensor 4) can detect a relative angle position within one rotation of the shaft.

The external sensor system has enough resolution to identify which measurement sector 5 is detected by third sensor 4. Thus, the absolute rotational angle of the shaft can be determined from the measurement values of the internal and external sensor systems.

As described, drive wheel 3 has measurement sectors 5 lying adjacent to one another in the circumferential direction. Third sensor 4 detects the relative angular position of the shaft with respect to a measurement sector 5. The external sensor system can determine the respective instantaneous measurement sector 5 detected by third sensor 4. The external sensor system is an absolute measuring system with a relatively small angular resolution over an angular region consisting of a plurality of revolutions. The internal sensor system refines the measured value of the external sensor system. The internal sensor system measures within a small angular range with particularly high resolution. This results in a high hysteresis free angular resolution over a large angular region.

FIG. 2 illustrates the bottom side of the angle sensor whereas FIG. 1 illustrates the top side of the angle sensor. As indicated in FIG. 2, driven wheels 1a, 1b and drive wheel 3 are located below circuit board 6. First, second, and third sensors 2a, 2b, 4 are on circuit board 6. Sensors 2a, 2b, 4 are designed using integrated circuit technology. Third sensor 4 is arranged on the side facing magnet ring 13. Additional electronic circuit components and conductor paths that cooperate with sensors 2a, 2b, 4 have been dispensed with in FIG. 2 for clarity.

FIG. 2 further illustrates the arrangement of measurement sectors 5 of magnet ring 13 on drive wheel 3. As indicated, measurement sectors 5 are magnetic-based. To this end, alternating magnetic north and south poles are arranged in the circumferential direction of drive wheel 3. The alternating magnetic north and south poles are symbolically shown in FIG. 2 by black and white segments. A measurement sector 5 is formed by a respective pair of magnetic poles. Since the field vector changes its direction continuously in the vicinity of the magnetic poles, the position of two adjacent magnetic poles can be determined with high precision relative to third sensor 4 by a measurement of the magnetic flux density or the field direction by third sensor 4. The analog value detected is then converted directly into a digital value by third sensor 4.

Since third sensor 4 does not allow an absolute angular measurement to be made, the absolute angle of rotation of the shaft is determined with lower precision by the external sensor system (namely by driven wheels 1a, 1b and corresponding sensors 2a, 2b). The resolution capability of the external sensor system (1a, 1b, 2a, 2b) is designed such that the respective measurement sector 5 that is instantaneously detected by third sensor 4 can be determined unambiguously by the external sensor system.

The external sensor system (1a, 1b, 2a, 2b) thereby generates a coarse value of the absolute angle of rotation of the shaft. The high resolution measurement of the internal sensor system (namely drive wheel 3, third sensor 4, and measurement sectors 5) refines the coarse value of the absolute angle of rotation of the shaft. Because drive wheel 3 is connected directly to the shaft, the high resolution angle measured is not distorted by mechanical play or shape tolerances of gear rings 8a, 8b, 9.

As noted, the resolution capability of the external sensor system (1a, 1b, 2a, 2b) is designed such that the measurement sector 5 detected by third sensor 4 can be identified by the external sensor system. For example, assume the condition that the external sensor system is capable of measuring with an absolute precision of +2.5°. Consequently, the angular width of measurement sectors 5 of the internal sensor system can be determined to be 5° such that the external sensor system is capable of precisely determining a specific measurement sector 5. Graduation of the full circle into 5° wide measurement sectors produces an attainable total resolution of the angle sensor on the order of magnitude of 0.005°, for a resolution that can be managed with ten bits per measurement sector.

Figure 3:
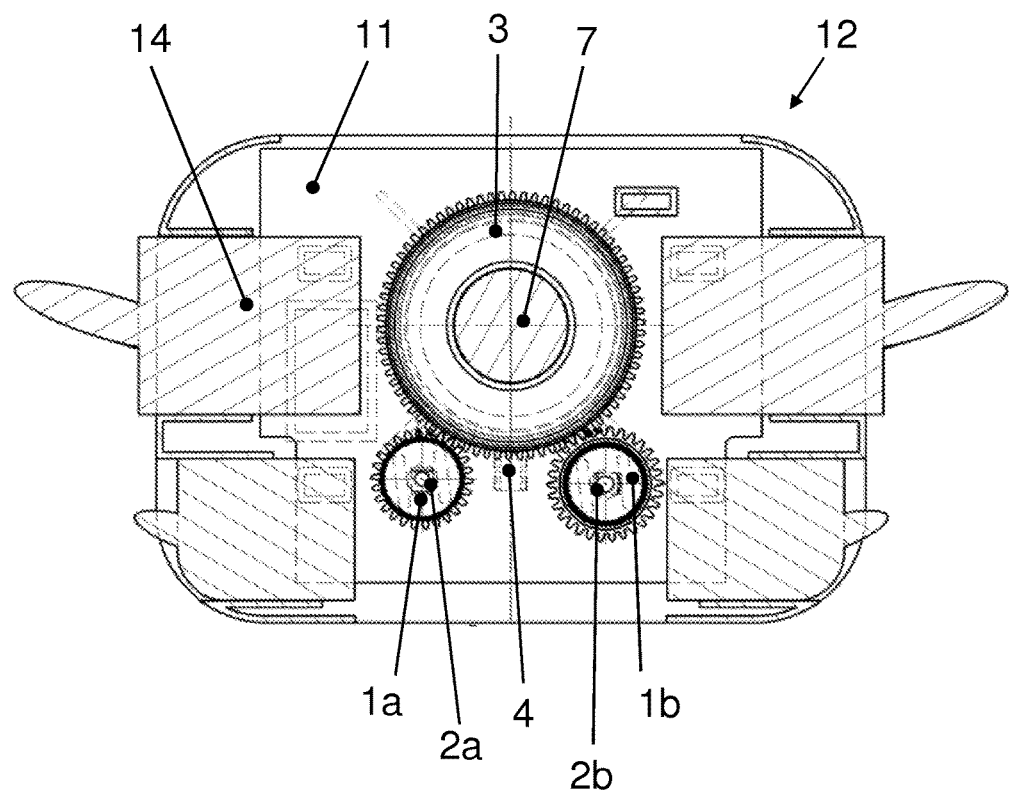
FIG. 3 illustrates a schematic view of the angle sensor used in an exemplary application.

Such an angle sensor can be used as the steering angle sensor in a vehicle. FIG. 3 illustrates a suitable layout. The angle sensor is designed as part of a steering column module 12. Steering column module 12 is arranged directly on the steering column of the vehicle. Steering column module 12 includes a plurality of control levers 14. First and second driven wheels 1a, 1b are rotationally arranged on a modular printed circuit board 11. Drive wheel 3 is connected directly to steering shaft 7 to rotate directly therewith. The back side of circuit board 11 supports first and second sensors 2a, 2b and third sensor 4. First and second sensors 2a, 2b are suitable for detecting the position of driven wheels 1a, 1b. The front side of circuit board 11 supports third sensor 4 which serves to detect the position of drive wheel 3.

If wheels 1a, 1b, 3 are respectively provided (as shown here) with magnets 1a, 1b, and magnet structures that form measuring sectors 5, then sensors 2a, 2b, 4 can be implemented as Hall or magneto-resistive sensors. In alternative designs, other measurement principles can be used. For example, an inductive measurement technique can be provided for the external sensor system and/or an optical measurement technique for the internal sensor system.

Drive wheel 3 that belongs to the internal sensor system is connected to steering shaft 7 without the intervention of gearing to enable a hysteresis-free, high-resolution angle measurement. Driven wheels 1a, 1b that are driven by drive wheel 3 can have hysteresis since their precision need only be sufficient to identify measurement sector 5 detected by third sensor 4 through a plurality of revolutions according to the nonius principle.

Due to the required mechanical coupling, all of wheels 1a, 1b, 3 are designed as cog wheels. Drive wheel 3 can thus be designed as a magnet ring 13 having measurement sectors 5 arranged along the circumference provided with a thermoplastic molding that forms gear ring 9. Magnet ring 13, in the form of a metallic, ceramic, or highly filled thermoplastic component with high dimensional stability can be used as the support structure for gear ring 9 in order to increase the quality of the gearing and concentric precision. Alternatively, magnet ring 13 is surrounded by a duroplastic material when drive wheel 3 is being formed. Drive wheel 3 can be entirely metal in which a cog wheel that is formed from aluminum or brass is connected with a magnet ring.

REFERENCE NUMBERS 1a, 1b first and second driven wheels
2a, 2b first and second sensors
3 drive wheel
4 third sensor
5 measurement sectors
6 circuit board
7 (steering) shaft
8a, 8b first and second gear rings
9 third gear ring
10a, 10b first and second magnets
11 modular printed circuit board
12 steering column module
13 magnet ring
14 control lever While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A system for detecting an overall absolute rotational angle of a shaft that can rotate through a plurality of revolutions, the system comprising:
a drive wheel directly connected to the shaft to rotate as the shaft rotates, the drive wheel including a coding having measurement sectors lying adjacent to one another in a circumferential direction of the drive wheel, each measurement sector having an angular range;
an external sensor system having first and second driven wheels engaged to the drive wheel to rotate as the shaft rotates;
the external sensor system further having first and second sensors to respectively detect rotational positions of the driven wheels;
wherein a coarse absolute rotational angle of the shaft at an angular resolution of the external sensor system is determined from the detected rotational positions of the driven wheels according to the Nonius principle;
a third sensor at a position relative to the drive wheel, wherein one of the measurement sectors is nearest the position of the third sensor at a time, the third sensor to sense the one of the measurement sectors to detect an angular position of the one of the measurement sectors relative to the position of the third sensor;
wherein the angular range of each of the measurement sectors is greater than or equal to the angular resolution of the external sensor system; and
wherein the overall absolute rotational angle of the shaft is determined from (i) the coarse absolute rotational angle of the shaft and (ii) the angular position of the one of the measurement sectors relative to the position of the third sensor.

2. The system of claim 1 wherein:
the measurement sectors are magnetic and the third sensor is a magnetic sensor.

3. The system of claim 1 wherein:
the first and second driven wheels respectively include first and second magnets which respectively rotate with the driven wheels; and
the first and second sensors are magnetic sensors respectively to monitor magnetization of the first and second magnets to thereby respectively detect the rotational positions of the driven wheels.

4. The system of claim 1 wherein:
the first and second sensors and the third sensor are fixedly-arranged on a circuit board.

5. The system of claim 1 wherein:
each wheel is a cog wheel.

6. The system of claim 1 wherein:
the coding of the drive wheel includes a magnet ring having the measurement sectors.

7. The system of claim 1 wherein:
the drive wheel includes a gear ring and each driven wheel includes a gear ring, the gear rings of the driven wheels engage the gear ring of the drive wheel to engage the driven wheels to the drive wheel.

8. The system of claim 7 wherein:
the gear ring of the drive wheel and the gear rings of the driven wheels have different numbers of teeth.

9. The system of claim 7 wherein:
the gear rings of the driven wheels have a different number of teeth from one another.

10. The system of claim 1 wherein:
the shaft is a steering shaft of a vehicle.

11. The system of claim 1 wherein:
each measurement sector includes a pair of alternating magnetic poles; and
the third sensor is a magnetic sensor whose measured value depends on the position of the third sensor relative to the magnetic poles of a measurement sector.

12. A system for detecting an absolute rotational angle of a shaft that can rotate through a plurality of revolutions, the system comprising:
a drive wheel directly connected to the shaft to rotate as the shaft rotates, the drive wheel including a coding having measurement sectors lying adjacent to one another in a circumferential direction of the drive wheel, each measurement sector having an angular range;
an external sensor system having first and second driven wheels engaged to the drive wheel to rotate as the shaft rotates and having first and second sensors to respectively detect rotational positions of the driven wheels;
wherein an absolute rotational angle of the shaft within an angular resolution of the external sensor system is determined from the detected rotational positions of the driven wheels according to the Nonius principle;
a third sensor at a position relative to the drive wheel, wherein one of the measurement sectors is nearest the position of the third sensor at a time, the third sensor to sense the one of the measurement sectors to detect an angular position of the one of the measurement sectors in relation to the angular range of the one of the measurement sectors relative to the position of the third sensor;
wherein the angular range of each of the measurement sectors is greater than or equal to the angular resolution of the external sensor system whereby the one of the measurement sectors is detectable from the detected rotational positions of the driven wheels according to the Nonius principle; and wherein an absolute rotational angle of the shaft is determined from (i) the determined absolute rotational angle of the shaft within the angular resolution of the external sensor system and (ii) the detected angular position of the one of the measurement sectors in relation to the angular range of the one of the measurement sectors relative to the position of the third sensor.

13. The system of claim 12 wherein:
the measurement sectors are magnetic and the third sensor is a magnetic sensor.

14. The system of claim 12 wherein:
the coding of the drive wheel includes a magnet ring having the measurement sectors.

15. The system of claim 12 wherein:
each measurement sector includes a pair of alternating magnetic poles; and
the third sensor is a magnetic sensor whose measured value depends on the position of the third sensor relative to the magnetic poles of a measurement sector.

* * * * *